Aug. 9, 1949.  J. C. TEMPLE, SR  2,478,676
MOLDING MACHINE

Filed July 16, 1946  4 Sheets-Sheet 1

INVENTOR
JOHN C. TEMPLE SR.

Robb+Robb
ATTORNEYS

Aug. 9, 1949.　　　　J. C. TEMPLE, SR　　　　2,478,676
MOLDING MACHINE

Filed July 16, 1946　　　　　　　　　　　　　　　4 Sheets-Sheet 3

INVENTOR
JOHN C. TEMPLE, SR.

ATTORNEYS

Aug. 9, 1949.   J. C. TEMPLE, SR   2,478,676
MOLDING MACHINE
Filed July 16, 1946   4 Sheets-Sheet 4

INVENTOR
JOHN C. TEMPLE, SR.
ATTORNEYS

Patented Aug. 9, 1949

2,478,676

UNITED STATES PATENT OFFICE 2,478,676

MOLDING MACHINE

John C. Temple, Sr., Sarasota, Fla.

Application July 16, 1946, Serial No. 683,845

15 Claims. (Cl. 25—94)

The present invention relates to molding apparatus, particularly of that type designed for molding hollow concrete or cinder blocks for building purposes.

The primary object of these improvements is to provide a machine with instrumentalities for feeding materials from a hopper to molds, compressing said materials while vibrating the same, displacing the molded blocks from the molds and bearing off the blocks as molded for storing or curing purposes.

In carrying out the foregoing objective, I have devised a series of coordinated mechanisms, automatically operated in proper cycles from a common source of power, so that the molding operation may be completed to the point of delivery or storage as a continuous progression of mechanical steps, thereby facilitating high mass production of building blocks of standard uniform quality.

One of the important features of this apparatus resides in the provision of mold-compression members as a part of the feed hopper to thereby directly receive the materials to be molded and holding back further feed of said materials as the blocks are being compressed into shape and delivered to the carrying-off conveyors.

It is further, a unique feature of my invention to arrange the compressing, ejecting, and core members within the confines of the feed hopper, so that it is possible first to cut off feed of the materials to the mold, extrude excess material, press the materials in the mold and finally displace the molded blocks. Preferably this cycle includes a vibrating operation which not only assists in compacting the material being molded, but also insures freedom of flow of the materials from hopper to the mold section thereof when the mold is opened to receive successive supplies of the material.

A further object of my invention is to provide a novel type of conveyor means arranged to coordinately function with the molding means to receive a block from the mold, lower the block to clear the mold and bear it off for transfer to a second conveyor for final delivery to the desired point of deposit.

Other and further objects and advantages of the invention will be hereinafter set forth and the novel features thereof defined by the appended claims.

General construction

Figures 1, 2:
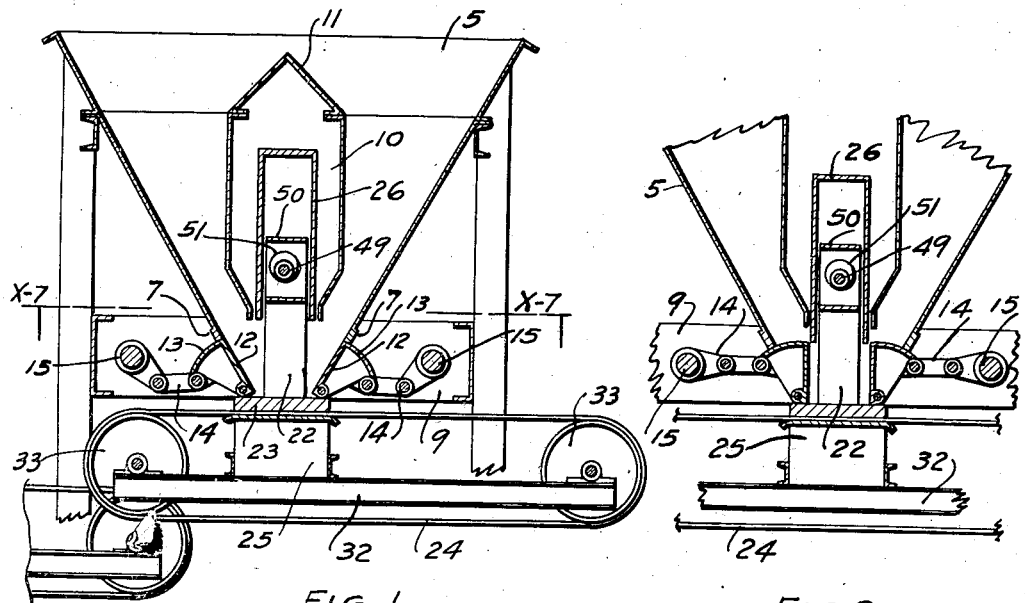
Figure 1 is a vertical sectional view taken on the line x—1, x—1, of Figure 4, showing the movable mold sides in open position forming continuations of the hopper side, the block extractor and pallet conveyor each being at their elevated positions ready for the initial molding step.
Figure 2 is a fragmentary view of the construction shown in Figure 1, illustrating the mold sides closed, the block extractor lowered to feed cut-off and compressing position, and the pallet conveyor elevated.

The molding machine which is the subject matter of this invention may be of any desired size and capacity, but as herein illustrated is designed to mold three hollow blocks, the description of a single mold for which is believed to suffice for an understanding of the arrangement. The machine includes the necessary structural framework for the various units, and since this may be of any form such as that clearly shown in the drawings, specific reference thereto need not be made. The operating units, with one exception, are all driven from a common power device or motor 1 which is connected through a chain of gearing 2 to the large driving gear 3 mounted on one end of the main drive shaft 4.

The hopper 5 is sufficiently long to feed all of the molds and the longitudinal sides of the hopper converge downwardly as best seen in Figure 1 to the points 7, while the transverse or partition walls 8, forming part of the molds, extend to the bottom of the horizontal sub-frame 9.

Mounted centrally within the hopper is a housing 10 (Figure 1) having a top 11, triangular in cross section, designed to shed the usual materials to be molded to either side so as to fall toward the throat of the hopper and into the molding space. The housing 10 is open at the bottom and covers the core and extractor devices to be referred to hereinafter.

The molding mechanism

Pivotally mounted in the frame 9 and at each side of the hopper below the points 7, is mounted a compressor plate 12 forming opposed mold sides which, when in open position of the mold, as shown in Figure 1, form aligned continuations of the inclined hopper sides. These plates have arcuate extensions or wings 13 to which are connected toggle links 14, the respective sets of these links being connected to their associated oscillating shaft 15.

Figure 4:
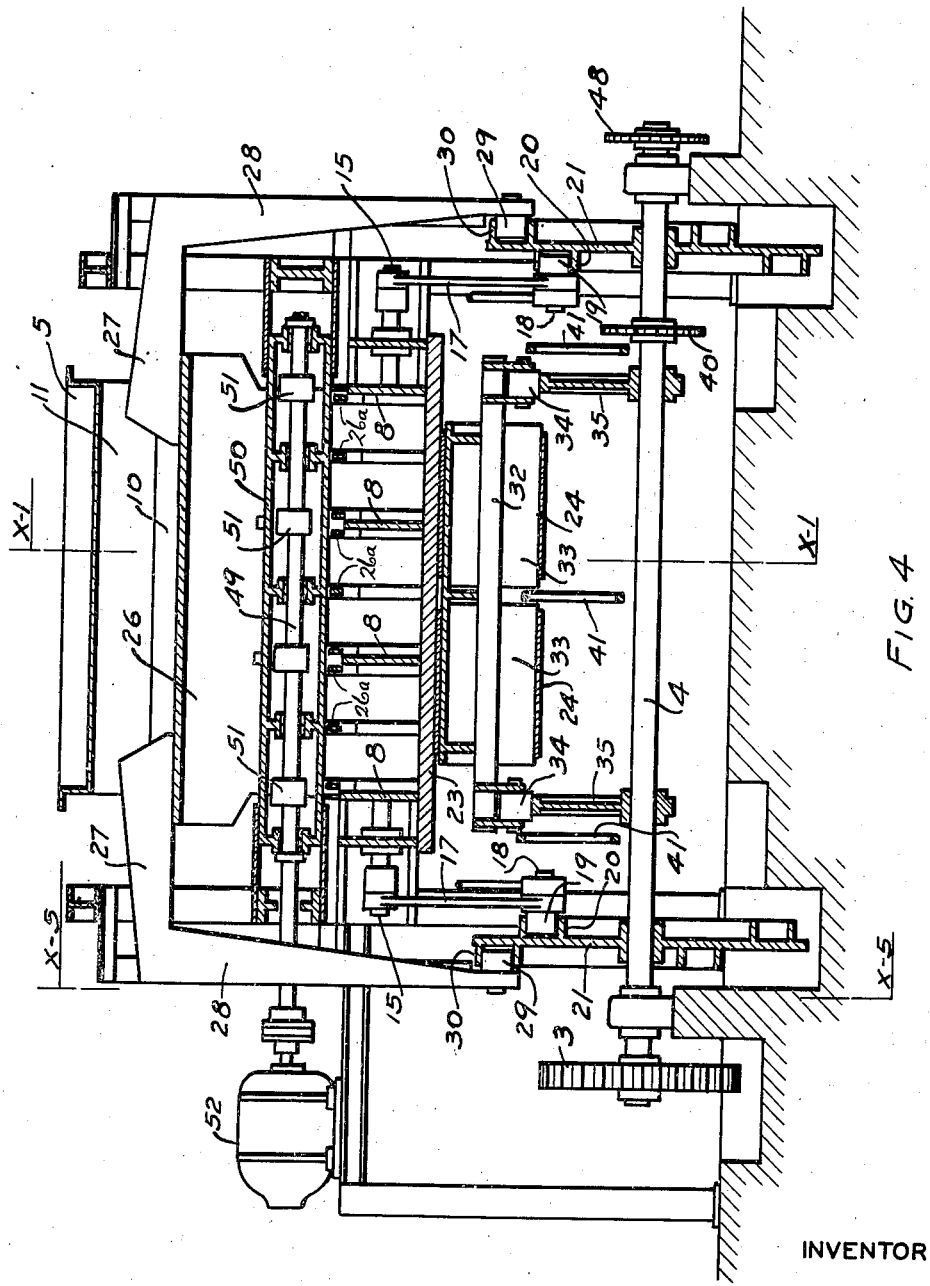
Figure 4 is a longitudinal sectional view on the line x—4, x—4, of Figure 5.
Figure 5:
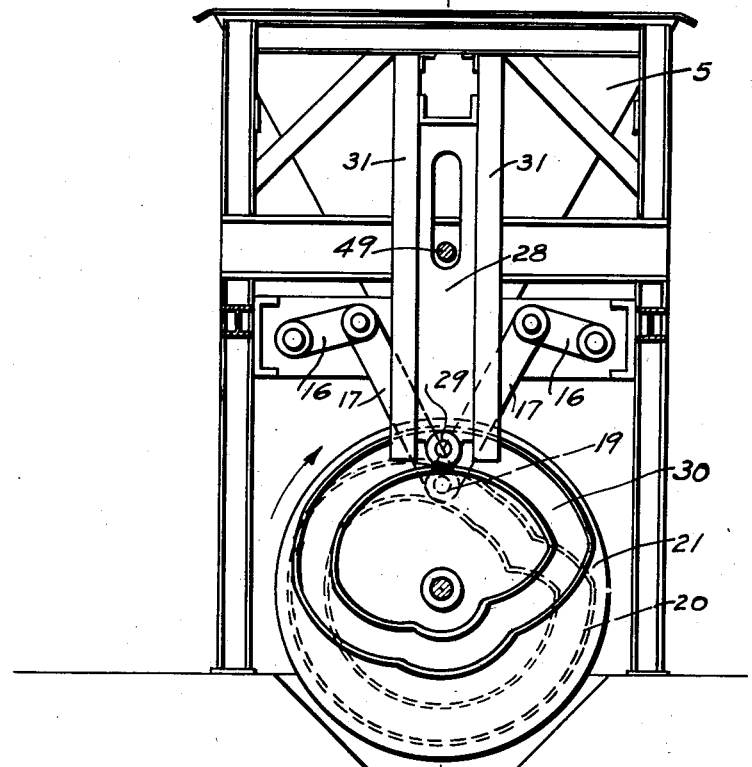
Figure 5 is a sectional view on the plane indicated by the line x—5, x—5, of Figure 4, showing more in detail the development of the actuating or cam means for the movable mold sides and the extractor arms.
Figure 7:
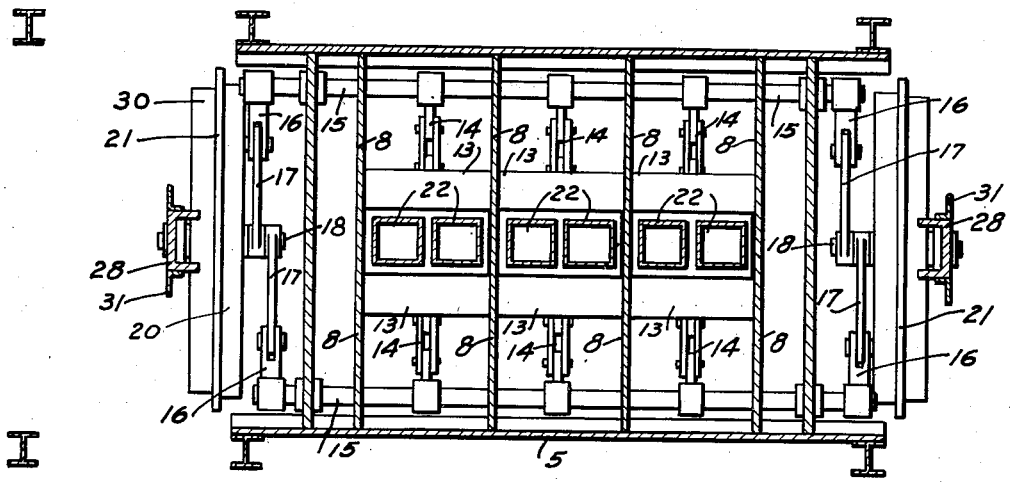
Figure 7 is a horizontal sectional view taken about on the plane indicated by the line x—7, x—7, of Figure 1, and showing in plan the arrangement of the molds and the actuating means for pressure sides thereof.

Referring to Figure 7, it will be seen that at each end, shafts 15 have a crank arm 16, and each pair of such arms is connected to links 17, and the latter in turn are connected together by pins 18. Each of these pins carries a cam roller 19 (Figure 4) engaging in a cam track 20 on the inner face of the associated cam wheel 21 mounted on the drive shaft 4. As the cam wheels rotate, the cam tracks cause the rollers 19 to actuate the linkage 17, thereby oscillating shafts 15 and through the toggle members 14 the hinged wing sections or pressure members 12 move inwardly to the position shown in Figure 2, compressing the block material around a central core or cores 22 and extruding excess material back into the hopper.

The compressed material at this point of operation rests upon the pallet 23 which in turn seats on the conveyor belts 24 directly over the table 25 beneath the upper reach of the off-bearing belts. This conveyor is shown at its uppermost position in Figures 1 and 2.

Extractor mechanism

At this stage of the cycle an extractor device comes into play. This device comprises the vertically movable frame 26 including cross bars 26a extending within and across the housing 10 and over the mold devices. The lower ends of the walls of this frame align with the side walls of the molded blocks and contact with the top of the molded material compressed first by the members 12. In the position of the machine as shown in Figure 1, the extractor is at its highest position, supported by the lateral U-shaped or channeled arms 27 (Figure 4) welded or otherwise secured to the frame 26 and having the depending vertical extensions 28. Each of the extensions carries a roller 29 at its lower end extending into a cam channel track 30 on the outer faces of the cam wheels 21. Vertical movement of this frame 26 is guided by the vertically arranged guides 31 at each end of the machine between which the arm extensions 28 reciprocate.

Figure 3:
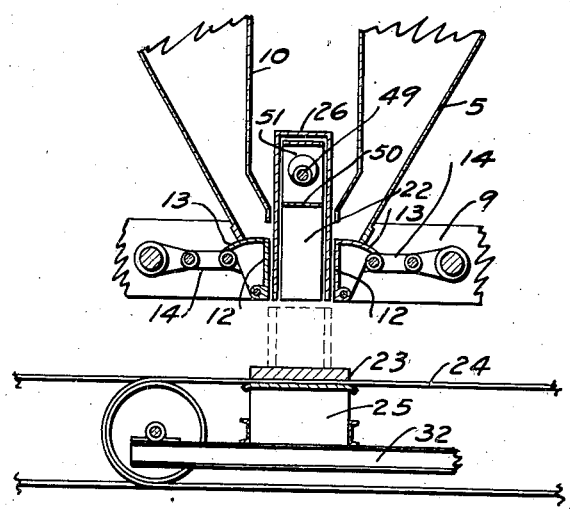
Figure 3 is a view similar to Figure 2, showing the extractor and pallet conveyor completely lowered with the molded block on the latter.

As obvious from the position of frame 26 in Figure 2, the extractor first drops onto and compresses the materials in the mold and then as the actuator cams 30 turn, it pushes the molded block or blocks downwardly and out of the molds, thus assuming the position shown in Figure 3. This movement is permitted by the simultaneous downward movement of the pallet 23, the conveyor belts 24 and the table support 25, now to be more specifically described.

Off-bearing conveyors

Figure 6:
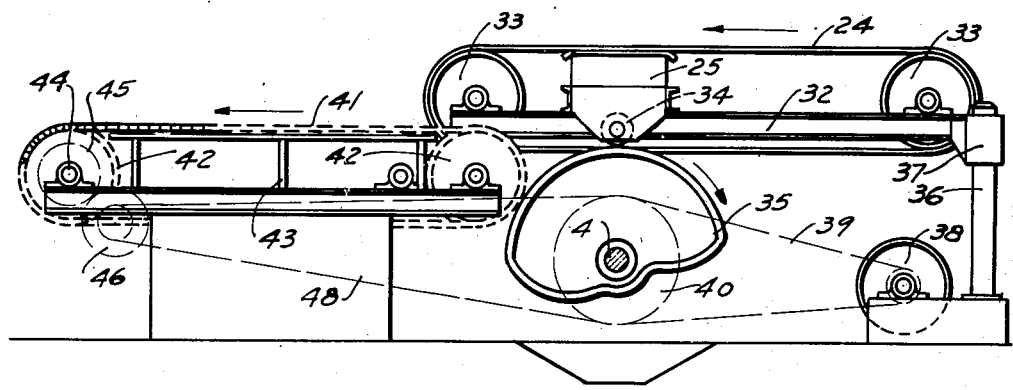
Figure 6 is a detail view in elevation of the off-bearing conveyors, and the camming means for raising and lowering the pallet conveyor.
Figure 8:
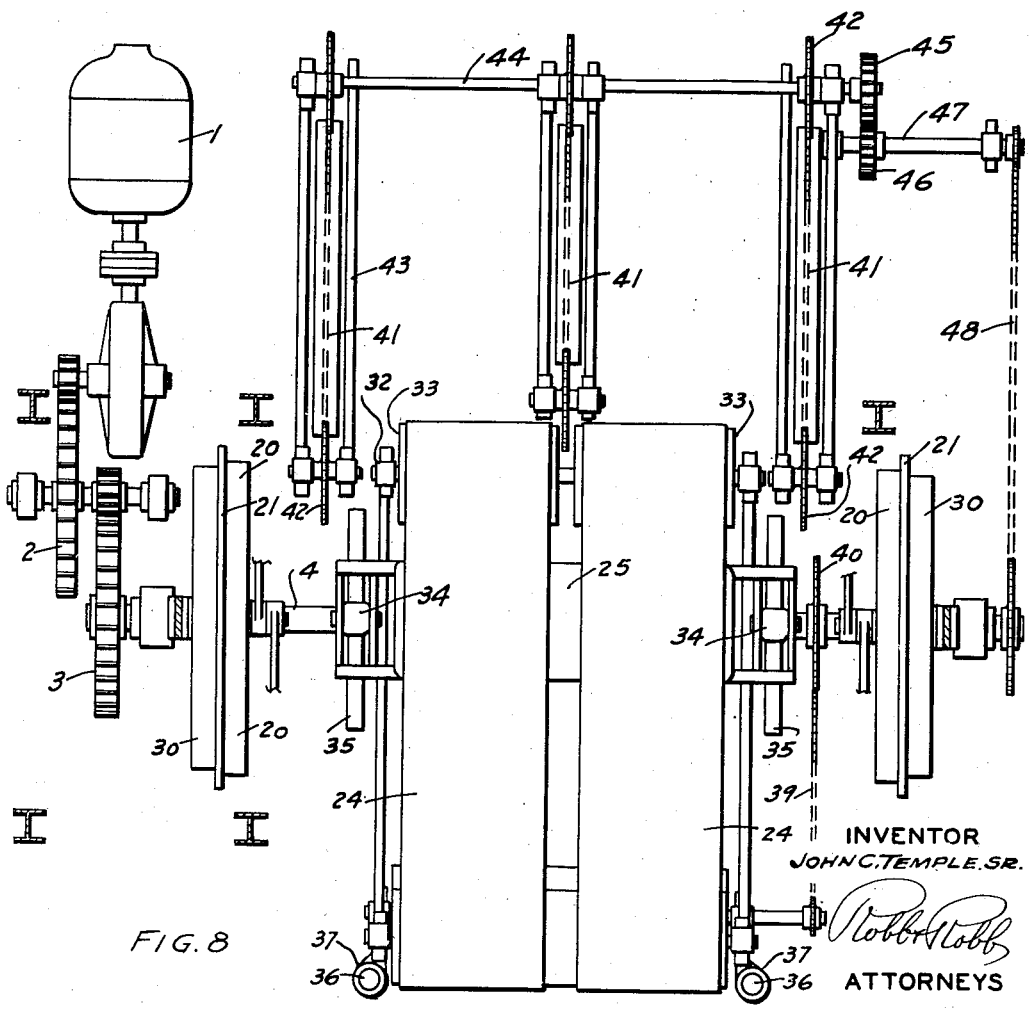
Figure 8 is a detail diagrammatic plan view of the conveyor belts and chains and the power driving means therefor.

Referring now to Figure 6, the table 25 is mounted under belt 24 upon the framework 32, carrying the belt pulleys 33. On the frame 32 are mounted rollers 34 which rest upon cam wheels 35 of proper shape to give rise and fall of the conveyor as a unit, guided by the upright posts 36 with which guide sleeves 37 cooperate. The dropping of the table 25 is arranged in timed relation to the ejector action so that the complete displacement of the blocks from the mold is effected as shown in Figure 3 by the rotation of the cam wheels 35 connected to the shaft 4. When the conveyor unit reaches its extreme lowermost position, contact is made with pulley 38, continuously driven by the chain 39 and sprocket 40 from shaft 4, for a predetermined interval determined by the contour of cams 35. During this contact, the conveyor belts 24 travel in the direction of the arrow (Figure 6), carrying the pallet 23 and blocks thereon to the off-bearing chains 41. It will be noted in Figure 8 that the conveyor unit actually comprises two belts and therefore the chains 41 are so spaced as to permit the movement of these belts downwardly and upwardly therebetween. The pallet, however, is sufficiently long to extend across the several chains of the chain conveyor.

These chains pass around sprockets 42 mounted in the stationary frame 43 at one end of which the sprocket shaft 44 is provided with a gear 45 meshing with a gear 46 on the short shaft 47 driven by the drive shaft 4 through the sprocket and chain connection therewith, designated 48.

This chain conveyor unit or section may be of any desired length so as to convey the blocks to the desired point of deposit, and the chains 41 thereof are driven at a somewhat higher speed than the belts 24 so that the block pallet will be removed from the path of belts 24 for the subsequent raising operation of the belt conveyor unit and deposit thereon of the next pallet.

Vibrator mechanism

While it is not essential to do so, I prefer to employ in this molding machine vibrating means to assist in the feeding of the materials to completely surround the mold cores, and to facilitate the extruding of excess material as the side wings 12 are closed. The vibration also aids in compacting the mold material so as to produce a firmly compacted block.

This mechanism includes the shaft 49 extending through the core supporting frame 50, and weights 51 eccentrically mounted on said shaft and a suitable motor 52. Rotation of the shaft will obviously vibrate the assembly and the mold material.

Operation

The operation of this machine will be clear from the foregoing description of its various units. By properly arranging the camming devices, so as to move in timed relation to each other, the sequence of steps in the molding and carrying-off of the blocks will be readily automatically effected.

Of primary importance is the arrangement of the feed hopper and block mold as one unit and the use of the movable mold sides as part of the hopper walls when said sides are in their open position and as the pressure plates to compact, mold the material and cut off feeding of the latter during the molding cycle. The synchronized mechanisms for the above purpose alternately open and close the bottom of the hopper to admit new block material, vibrate said material, where desirable, during feed and molding of the material, extrude excess material from the mold, compress the residue, eject the finished block onto conveyor devices and convey away the block, all with exact timing as between the various steps of the operations.

This machine includes preferably a double or two-section conveyor system for off-bearing of the blocks, since this enables the removal of the finished blocks at a greater speed than that of the movement of empty pallet into position under the molds. This arrangement also enables the continuous movement of the second section conveyor and remote delivery of the finished block, while the first section is going through its vertical movement to clear the block from the molds and establish intermittent drive of the first section by contact with a continuously operating driving pulley.

While the specific details of construction have been herein shown and described, the invention is not confined thereto, as changes and alterations may be made without departing from the spirit thereof as defined by the appended claims.

I claim:

1. In a block molding machine of the class described, a material hopper into which material to be molded is received, a molding device at the bottom thereof having wall sections coacting with the walls of the hopper when said device is in open position to receive block molding material fed by the hopper to the device, said device having cut-off means movable into the path of flow of said material to said molding device, and means to open said molding device to receive the molding material and to then close the mold device to reduce its capacity and to cut-off flow of hopper containing material and compress the block forming material fed into the molding device.

2. In a block molding machine of the class described, a material hopper, the sides of the hopper having movable sections at the bottom thereof pivotally mounted to swing from co-planar position relative to the sides when receiving material to be molded to vertical position to compress said material into block form, and actuating means for shifting the movable sections to and from molding position comprising a rotary cam, an oscillating shaft, and link members between said cam and shaft and between said shaft and movable sections.

3. In a block molding machine of the class described, a material hopper having shiftable block molding members at the bottom thereof forming part of the hopper walls, a block support beneath the molding members, a core member within the mouth of the hopper, an extractor device also in said hopper, and means for actuating said molding members and said extractor device in timed relation to each other to mold and compress the material into block form in the hopper and displace the molded block therefrom.

4. A molding machine as set forth in claim 3, combined with means for lowering the molded block support simultaneously with the ejection of the block by the extractor device.

5. A molding machine as set forth in claim 3, wherein the block support comprises an off-bearing conveyor, combined with means for lowering the block support and conveyor simultaneously with the ejection of the block from the molding members onto the conveyor, and means for driving said conveyor and block when clear of the molding members to carry the block away from the hopper.

6. In a block molding machine of the class described, a material hopper, block molding members at the bottom of said hopper and forming a part thereof, a core member in said hopper, means for shifting the molding members from open to closed molding position, an extractor arranged above the core member, means for moving the extractor to first compact material as the block molding members close and compress the same, and then continue the extractor movement to displace the molded material from the hopper, a pallet to receive the molded material, an off-bearing conveyor for shifting the said material away from the hopper, means for lowering the conveyor away from the hopper, and means for driving said conveyor rendered operative incident to the lowering movement of the conveyor.

7. In a block molding machine of the class described, a material hopper, a mold device at the bottom of said hopper and forming part thereof, certain of the walls of said device being movable away from each other to receive the material to be molded and also movable toward each other to compress the received material, a core member in said hopper, a block extractor in said hopper movable into the mold device to displace the molded material from the hopper, and means mounted within the hopper for vibrating the molding material during feed of the same to the molding device and also while molding the material.

8. In a block molding machine of the class described, a material holding hopper, a pressure mold mounted at the bottom of said hopper and forming a part thereof and having sides movable toward and away from each other to change the capacity of the mold, a pallet support at the bottom of said hopper, a core member coacting with said pallet support, an extractor device in said hopper for compacting and displacing the molded material from the pressure mold, a conveyor unit for bearing off the molded material, and synchronized mechanisms for alternately opening and closing the pressure mold to admit new material, and extruding excess material from the pressure mold, for compressing the residue of the material and operating the extractor and conveyor devices in timed sequence with relation to each other.

9. A block molding machine as set forth in claim 8, combined with a vibrating frame within the hopper, vibrating elements in said vibrating frame, core elements suspended from said frame into the pressure mold area, and means for operating the vibrating frame to impart a vibrating effect to the molded material in the process of filling said pressure mold.

10. In a block molding machine of the class described, a material holding hopper, pressure molding members forming in one position a part of the hopper and in another position a mold for the material fed thereto from the hopper, multiple cores within the hopper about which said material is molded into block form, an extractor device in said hopper for vertical compression of the material in the molding operation and ejecting the molded material from said mold, a pallet onto which the molded material is to be ejected, a conveyor device for supporting the pallet in position to receive the molded material, means for lowering the conveyor device upon the completion of molding, a rotating member in the path of the lowering movement of said conveyor device with which the conveyor contacts to effect drive of the conveyor device, and a second conveyor device for receiving the molded material from the first conveyor, and common actuating means for said molding members, the extractor device, and said first and second conveyors.

11. A molding machine as set forth in claim 10, combined with a vibrator unit for vibrating the core members, extractor device, and imparting vibration to the material in the hopper and the mold formed by the said molding members.

12. In a block molding machine of the class described, the combination of a material holding hopper, a molding device associated with said hopper and forming a part thereof, an endless conveyor arranged beneath the hopper and including means for supporting a pallet beneath the molding device, a cam member for effecting lowering movement of the conveyor upon completion of the molding operation, means in the path of the lowering movement of said conveyor for driving the conveyor to displace the pallet and molded material thereon, a second conveyor onto which the molded material is transferred during the lowering movement of the first conveyor, and means for moving said second conveyor at a speed in excess of the movement of the first conveyor.

13. In a molding machine of the class described, a material holding hopper having converging sides terminating in movable molding pressure plates, pivot means for said pressure plates, said plates having cut-off means for cutting off the flow of material during the molding operation by said pressure plates, means for alternately shifting the pressure plates inwardly and outwardly to compress blocks of the molding material and release the same, a vertically movable extractor device within said hopper, means for moving the extractor device upwardly and downwardly to compress the blocks and eject the same from the mold members, a core member within the hopper, a housing in said hopper within which the extractor device and core member are mounted, off-bearing conveyor means including a vertically movable belt conveyor section for receiving a pallet and supporting the blocks during the molding operation and conveying the blocks after molding away from the hopper, a second section for receiving the molded block from the first section incident to the lowering movement of the first section, and means for activating the first section at a point in the lowering movement of the same.

14. In a block molding machine of the class described, the combination of a material holding hopper, a pressure mold device at the bottom of said hopper and forming a part thereof, an extractor device within the hopper for vertical movement to compress the molding material during the molding operation and to eject the molded blocks after the molding operation, off-bearing conveyor means for receiving and holding pallets to receive the molded blocks from the hopper and to convey said blocks after molding away from the hopper, a second conveyor means for said off-bearing of the molded blocks, and common actuating means for the pressure mold device, the extractor and the said conveyors.

15. A molding machine as set forth in claim 14, wherein the actuating means includes synchronized cams mounted upon a single drive shaft and rollers cooperating with said cams.

JOHN C. TEMPLE, Sr.

REFERENCES CITED

The following references are of record in the file of this patent:

UNITED STATES PATENTS

| Number | Name | Date |
|---|---|---|
| 1,551,608 | Norton | Sept. 1, 1925 |
| 1,581,814 | Schuh | Apr. 20, 1926 |
| 1,644,175 | Church | Oct. 4, 1927 |
| 1,675,906 | Oeffner | July 3, 1928 |
| 2,320,728 | Hume | June 1, 1943 |
| 2,352,771 | Cowan et al. | July 4, 1944 |